Aug. 29, 1939.  F. M. ARCHIBALD  2,171,250
OLEFIN POLYMERIZATION
Filed June 13, 1935
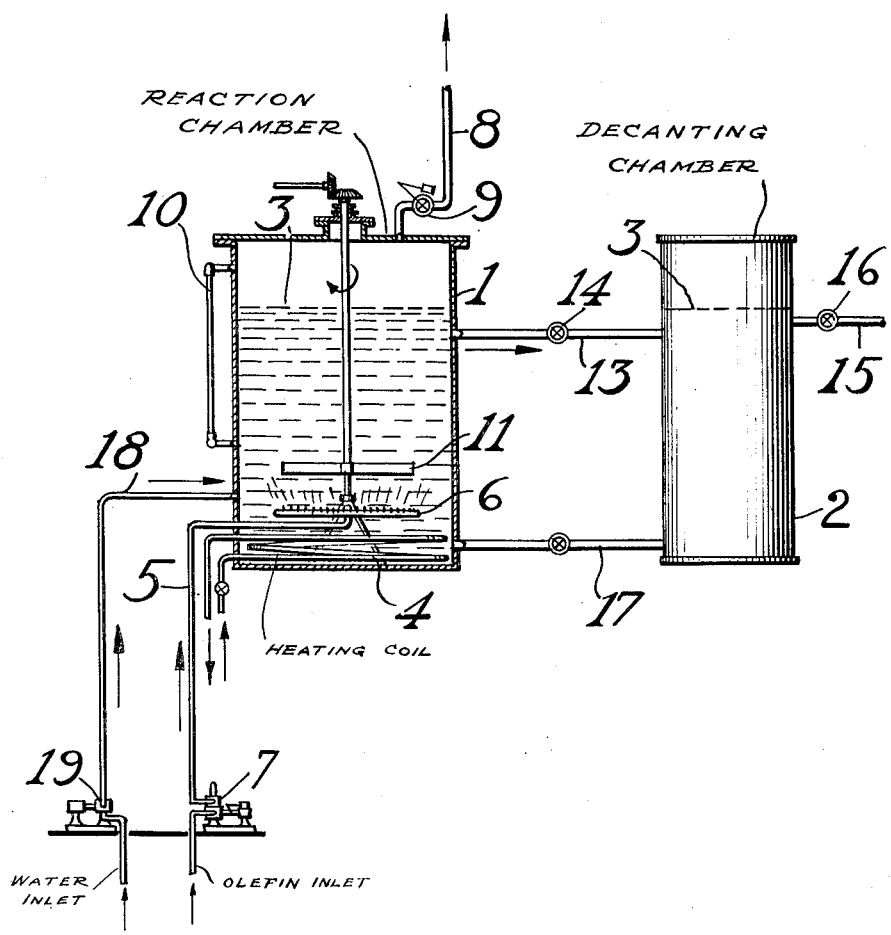
Francis M. Archibald Inventor
By P. L. Young Attorney Patented Aug. 29, 1939

2,171,250

UNITED STATES PATENT OFFICE 2,171,250

OLEFIN POLYMERIZATION

Francis M. Archibald, Elizabeth, N. J., assignor to Standard Alcohol Company

Application June 13, 1935, Serial No. 26,406

6 Claims. (Cl. 260—683)

This invention relates to improvements in olefin polymerization and relates especially to the conversion of low boiling olefins into higher boiling compounds in the gasoline boiling range.

Polymers of hydrocarbons, especially those of iso-olefins such as iso-butylene, either alone or in combination with olefins, have formerly been obtained by absorbing the olefins in a comparatively strong sulfuric acid of about 50 to 70% strength, heating the sulfuric acid with the absorbed olefins in solution to about 100° C. and removing the polymers that are formed and separate on heating. The sulfuric acid is then cooled and employed for treating further quantities of hydrocarbons.

An object of this invention is to provide a method in which the alternate heating and cooling of the sulfuric acid is not required.

This, and other objects of my invention, will be readily understood on reading the following description with reference to the accompanying drawing.

A reaction chamber and decanting chamber denoted by numerals 1 and 2, are filled to the level 3 with sulfuric acid of 55% to 85% strength. A heating coil 4 is provided to keep the temperature of the sulfuric acid within the range of about 130° C. to 60° C.

The hydrocarbons containing the olefins in liquid or gaseous form are passed under pressure into the lower part of the reaction chamber 1 through pipe 5 and spray outlet 6, by means of pump 7. The unreacted gases or liquids are removed by pipe 8 provided with a pressure release valve 9. A pressure of about 30 to 100 pounds per square inch is maintained in the reaction chamber 1 and decanting chamber 2 though a pressure of about 50 pounds per square inch is preferred. A gauge 10 is provided to indicate the level of liquid in the reaction chamber 1. A stirrer 11 rotated by means of shaft 12 and a motor not shown, is provided to mix the sulfuric acid and the olefins forming an emulsion. The gravity of the resulting emulsion mixture being lower than that of sulfuric acid, results in a flow of the emulsion through pipe 13 provided with valve 14 into decanter 2. A separation of the polymerized olefins from the sulfuric acid takes place and layers of polymerized olefins and sulfuric acid are formed, and the polymerized olefins are removed through pipe 15 provided with pressure release valve 16. The separated sulfuric acid flows to reaction chamber 1 through pipe 17.

Alternately a single chamber may be used which is tall and constricted in form. This chamber is about three-fourths filled with sulfuric acid maintained at the desired temperature by means of steam coils. The hydrocarbons containing the olefins are passed into the lower part of the chamber, and by gravity gradually rise to the upper part. Unreacted hydrocarbons in the form of gases are removed through an outlet in the top of the chamber. A layer of polymers is formed above the body of the sulfuric acid, and these polymers may be removed through an outlet in the side of the chamber, which is in space relation to the top of the chamber.

The treatment of olefins with sulfuric acid of a 55% to 84% strength at temperatures within the range of about 130° C. to 60° C. may also convert some of the tertiary olefins that are present directly into alcohols. These alcohols dissolve in the polymerized olefins having a boiling range within the gasoline range and are removed together with the separated polymerized olefins. Sufficient water as needed, is added to compensate for the water removed by hydration of the olefins through pipe 18 by means of pump 19. Higher temperatures are used with weaker acids and lower temperatures with stronger acids.

For example, where an 80% strength acid was used at a temperature of 60° C. and a mixture of butane and isobutylene was passed through this acid, 21.3% of polymer on the feed mixture of butane and isobutylene was obtained.

Where 75% acid at a temperature of 71° C. was used a mixture of an olefin and an isoolefin, when passed through the layer of sulfuric acid, gave a yield of 11.4% of the polymer on the mixture of olefin and isoolefin.

The tertiary alcohols being water-soluble, may be separated if desired, by washing the separated mixture of tertiary alcohols and polymerized olefins with water. It is preferred that the mixture of polymerized olefins and tertiary alcohols be used as such, or mixed with a motor gasoline to be used as a motor fuel for internal combustion engines.

Having thus described the invention, it is not intended that it be limited by any of the specific examples given, but it is desired to claim all inherent novelty as broadly as the prior art permits.

I claim:

1. An improved process for producing hydrocarbon polymers of the motor fuel range comprising passing a mixture of light hydrocarbons, including iso-olefins through a bath of aqueous sulfuric acid of 55 to 85% concentration, at a temperature of from about 60 to 130° C., whereby polymers are produced, removing the reacted mixture to a separation zone maintained under substantially the same reaction conditions and withdrawing the hydrocarbons from the acid phase.

2. An improved process for producing hydrocarbon polymers of the motor fuel range comprising dispersing a mixture of hydrocarbons including iso-olefins in sulfuric acid of 55 to 85% concentration, contained in a polymerization zone and maintained at a temperature of 60 to 130° C., and at a pressure adapted to maintain the hydrocarbon in liquid condition, removing the dispersion of acid and hydrocarbons to a separation zone maintained under substantially the same reaction conditions and removing the hydrocarbon phase from the separation zone.

3. An improved process for producing hydrocarbon polymers of the motor fuel range comprising dispersing a mixture of low boiling hydrocarbons including iso-olefins in sulfuric acid of 55 to 85% strength contained in a polymerization zone and maintained at a temperature of 60 to 130° and at pressure adapted to maintain the hydrocarbon in a liquid condition, removing the dispersion of acid and hydrocarbon to a separation zone maintained under substantially the same conditions of temperature and pressure, separately withdrawing the hydrocarbon and the acid phases and returning the acid to the polymerization zone.

4. An improved process for producing hydrocarbon polymers of the motor fuel boiling range, comprising dispersing a mixture of hydrocarbons including isobutylene in sulfuric acid of 55 to 85% concentration contained in a polymerization zone and maintained at a temperature of 60 to 130° C. and under pressure of about 30 to 100 pounds per square inch, and adapted to maintain the hydrocarbon in a liquid condition, removing the dispersion of acid and hydrocarbon to a settling zone maintained under substantially the same pressure and temperature conditions, returning the acid from the separation zone to the polymerization zone and withdrawing the hydrocarbon from the settling zone.

5. A process of producing hydrocarbons boiling within the gasoline boiling range from a mixture containing gaseous iso-olefins and olefins according to claim 1 in which any tertiary alcohols formed are separated from their solution in the resulting liquid hydrocarbon mixture by treatment of the mixture with water.

6. A process of producing hydrocarbons boiling within the gasoline boiling range from a mixture containing gaseous isoolefins and olefins according to claim 1 in which water is added to keep the sulfuric acid at a 55% to 85% concentration.

FRANCIS M. ARCHIBALD.